(12) United States Patent
McPherson et al.

(10) Patent No.: US 11,423,041 B2
(45) Date of Patent: *Aug. 23, 2022

(54) MAINTAINING DATA LINEAGE TO DETECT DATA EVENTS

(71) Applicant: Amazon Technologies, Inc., Seattle, WA (US)

(72) Inventors: George Steven McPherson, Seattle, WA (US); Mehul A. Shah, Saratoga, CA (US); Prajakta Datta Damle, San Jose, CA (US); Gopinath Duddi, San Jose, CA (US); Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 244 days.

This patent is subject to a terminal disclaimer.

(21) Appl. No.: 16/752,022

(22) Filed: Jan. 24, 2020

(65) Prior Publication Data

US 2020/0159742 A1 May 21, 2020

Related U.S. Application Data

(63) Continuation of application No. 15/385,789, filed on Dec. 20, 2016, now Pat. No. 10,545,979.

(51) Int. Cl.
| | | |
|---|---|---|
| *G06F 17/00* | (2019.01) | |
| *G06F 16/25* | (2019.01) | |
| *G06F 16/23* | (2019.01) | |
| *G06F 16/2455* | (2019.01) | |

(52) U.S. Cl.
CPC ........ *G06F 16/254* (2019.01); *G06F 16/2393* (2019.01); *G06F 16/2455* (2019.01); *G06F 16/258* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | |
|---|---|---|
| 8,024,369 B2 | 9/2011 | Pellegrini et al. |
| 8,037,050 B2 | 10/2011 | Oliver et al. |
| 8,136,158 B1 | 3/2012 | Sehr et al. |

(Continued)

OTHER PUBLICATIONS

U.S. Appl. No. 15/385,777, filed Dec. 20, 2016, Mehul A. Shah et al.

(Continued)

*Primary Examiner* — Hung D Le
(74) *Attorney, Agent, or Firm* — Robert C. Kowert; Kowert, Hood, Munyon, Rankin & Goetzel, P.C.

(57) ABSTRACT

History for data objects may be maintained to detect data events. An indication of an Extract, Transform, Load (ETL) process applied to one or more source data objects to generate one or more transformed data objects may be received. History for the source data objects may be updated to include the transformed data objects and the ETL process that generated the transformed data objects. An evaluation of the update may be performed to determine whether an event associated with the data lineage is triggered. If the event is triggered, a notification of the event may be sent to one or more subscribers for the event.

20 Claims, 9 Drawing Sheets

(56) References Cited

U.S. PATENT DOCUMENTS

| | | | |
|---|---|---|---|
| 8,751,438 | B2 | 6/2014 | Kharod et al. |
| 8,752,047 | B2 | 6/2014 | Banga et al. |
| 8,788,931 | B1 | 7/2014 | Chen et al. |
| 9,430,114 | B1 | 8/2016 | Dingman et al. |
| 9,471,775 | B1 | 10/2016 | Wagner et al. |
| 9,684,785 | B2 | 6/2017 | Walsh |
| 9,898,515 | B1 | 2/2018 | Avagyan et al. |
| 10,545,979 | B2 | 1/2020 | McPherson et al. |
| 2002/0059566 | A1 | 5/2002 | Delcambre et al. |
| 2003/0196193 | A1 | 10/2003 | Kuzmin |
| 2005/0097561 | A1 | 5/2005 | Schumacher et al. |
| 2005/0273772 | A1 | 12/2005 | Matsakis et al. |
| 2005/0283622 | A1 | 12/2005 | Hall et al. |
| 2007/0203719 | A1 | 8/2007 | Kenagy et al. |
| 2007/0203923 | A1 | 8/2007 | Thomas |
| 2007/0266426 | A1 | 11/2007 | Iyengar et al. |
| 2008/0052534 | A1 | 2/2008 | Harada et al. |
| 2008/0104014 | A1 | 5/2008 | Burger et al. |
| 2009/0177671 | A1 | 7/2009 | Pellegrini et al. |
| 2009/0192979 | A1 | 7/2009 | Lunde |
| 2009/0240663 | A1* | 9/2009 | Plattner ............... G06F 16/2379 |
| 2010/0030750 | A1 | 2/2010 | Oliver |
| 2010/0058291 | A1 | 3/2010 | Hahn et al. |
| 2010/0086610 | A1* | 4/2010 | Rome ................ A61K 47/6901 |
| | | | 514/1.1 |
| 2010/0274750 | A1 | 10/2010 | Oltean et al. |
| 2011/0023028 | A1 | 1/2011 | Nandagopal et al. |
| 2011/0107383 | A1 | 5/2011 | Barton et al. |
| 2011/0154431 | A1 | 6/2011 | Walsh |
| 2012/0042162 | A1 | 2/2012 | Anglin et al. |
| 2012/0054744 | A1 | 3/2012 | Singh et al. |
| 2012/0203877 | A1 | 8/2012 | Bartholomay et al. |
| 2013/0167222 | A1 | 6/2013 | Lewis |
| 2013/0275360 | A1 | 10/2013 | Kharod et al. |
| 2013/0290928 | A1 | 10/2013 | Johnson |
| 2015/0100542 | A1 | 4/2015 | Li et al. |
| 2015/0113009 | A1 | 4/2015 | Zhou et al. |
| 2015/0286701 | A1 | 10/2015 | Wideman |
| 2015/0347539 | A1 | 12/2015 | Holmes et al. |
| 2015/0347541 | A1 | 12/2015 | Holmes et al. |
| 2015/0356293 | A1 | 12/2015 | Biswas |
| 2015/0370871 | A1* | 12/2015 | Bender ................ G06F 9/4881 |
| | | | 707/602 |
| 2016/0180084 | A1 | 6/2016 | Spurlock et al. |
| 2016/0224360 | A1 | 8/2016 | Wagner et al. |
| 2016/0224785 | A1 | 8/2016 | Wagner et al. |
| 2016/0246809 | A1 | 8/2016 | Romano et al. |
| 2016/0259628 | A1 | 9/2016 | Schuchman et al. |
| 2016/0352707 | A1* | 12/2016 | Belyy ................... H04L 63/061 |
| 2016/0360009 | A1 | 12/2016 | Borley et al. |
| 2017/0068595 | A1* | 3/2017 | Nautiyal ............... G06F 16/254 |
| 2017/0091673 | A1 | 3/2017 | Gupta et al. |
| 2017/0104627 | A1* | 4/2017 | Bender ............... H04L 67/1008 |
| 2017/0126795 | A1 | 5/2017 | Kumar et al. |
| 2017/0154019 | A1 | 6/2017 | Filipsk et al. |
| 2017/0185661 | A1 | 6/2017 | Belyy et al. |
| 2017/0213037 | A1 | 6/2017 | Toledano et al. |
| 2017/0220613 | A1 | 8/2017 | Gass et al. |
| 2018/0039490 | A1 | 2/2018 | Gass et al. |
| 2018/0129497 | A1 | 5/2018 | Biddle et al. |
| 2018/0157703 | A1 | 6/2018 | Wang et al. |
| 2018/0157842 | A1 | 6/2018 | Holz et al. |
| 2018/0189350 | A1 | 7/2018 | Imaki |
| 2018/0189510 | A1 | 7/2018 | Seko |
| 2018/0276781 | A1 | 9/2018 | Oliveria et al. |

OTHER PUBLICATIONS

Unknown, "Cloudera Data sheet", 2015, Retrieved from URL; http://www.Cloudera.com, pp. 1-2.

Oracle: "Triggers-Oracle Database Concepts", Retrieved from URL: https://Web.archive.org/web/20150918220843/https://docs.oracle.com/cd/B19306_01/server.102/b14220/triggers.htm, retrieved on Jan. 11, 2018, pp. 1-17.

Bratko, A. et al., "Exploiting Structural Information for semi-structured document categorization", Information Processing & Management, Dated May 1, 2006, vol. 42, No. 3, pp. 679-694.

Juan Trujillo et al., "A UML Based Approach for Modeling ETL Processes in data warehouses", In: Network and parallel computing, dated Oct. 16, 2003, pp. 1-14.

Anonymous, "Start informatica job when a row is updated", retrieved from URL: https://network.informatica.com/thread/13920. on Jan. 10, 2018. pp. 1-5.

Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.

International Search Report and Written Opinion from PCT/US2017/066928, dated Feb. 16, 2018, Amazon Technologies, Inc., pp. 1-18.

Anonymous "Metadata Manager—A Key Feature of Informatica PowerCenter Advanced Edition", Retrieved from URL: https://www.informatica.com/content/dam/informatica-com/global/amer/u/collateral/data-sheet/metadata-manager_data-sheet_6792.pdf. Dated Dec. 31, 2012, pp. 1-4.

Anonymous "Metadata Manager 10.0 User Guide", Retrieved from URL:https://kb.informatica.com/proddocs/Product%20Documentation/4/MM_100_MetadataManagerUserGuide_en.pdf. Dated Nov. 30, 2015, pp. 1-16.

* cited by examiner

MAINTAINING DATA LINEAGE TO DETECT DATA EVENTS

This application is a continuation of U.S. patent application Ser. No. 15/385,789, filed Dec. 20, 2016, which is hereby incorporated by reference herein in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by introducing different data formats that offer different processing or maintenance capabilities. However, introducing multiple data formats is not without cost. Data is often processed by different systems which may not support the current data format of the data. Thus, the techniques to extract, transform, and load data between different formats or locations are applied. As a result, data may evolve in content, schema, format, or location over time. Techniques that can track the evolution of data and take responsive action to the evolutions may be desirable.

Figure 1:
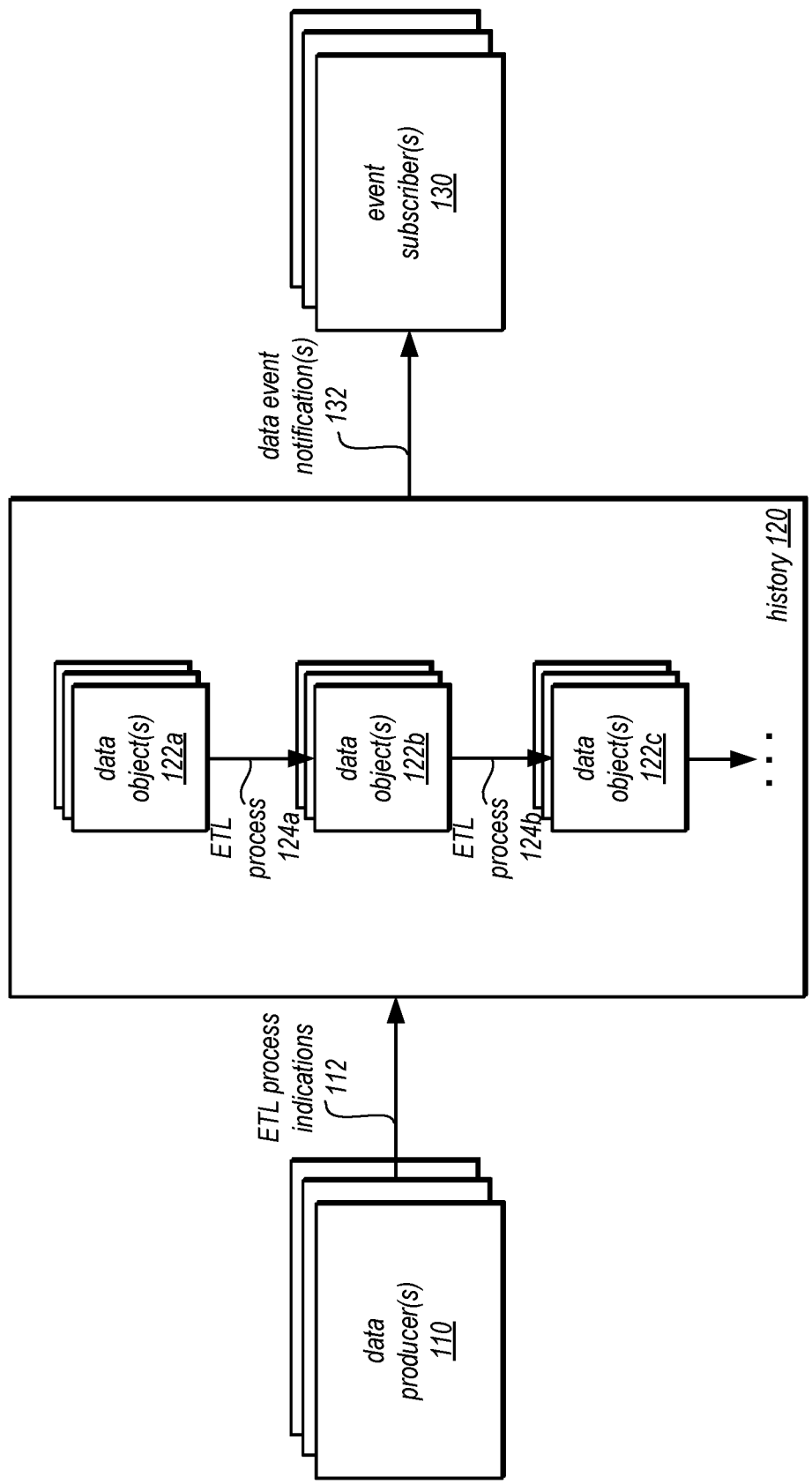
FIG. 1 is a logical block diagram illustrating maintaining history to detect data events, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of maintaining history to detect data events are described herein. ETL processing provides data administrators, stake holders, producers, or consumers with the ability to take advantage of different data formats, storage systems, or storage locations by facilitating the movement data across different data stores and data schemas or formats. For example, data producers that collect usage and other analytics for web site interactions (e.g., visitor clicks and other actions), may generate stored analytics data in large log files or other semi-structured data formats. However, in order to perform various analytical operations or queries over the analytics data, an ETL process may be performed to extract desired data, transformed the desired data into a format usable by an analytics engine, like a database system, and load the extracted data into the appropriate storage system in the appropriate data schema and format.

Typical ETL processing techniques rely upon chronological mechanisms for initiating the execution of ETL processing. An ETL process may be scheduled to execute nightly, or once a week at a certain time on a certain day. However, because ETL processing jobs interact with and transform data, the timing for executing ETL processing jobs may be optimally aligned with changes to data or events respecting data as data is not always created, updated, modified, or deleted upon a schedule, nor created, updated, modified, or deleted in the same way. For instance, new data objects may be created or stored in a data store to add another day's worth of sales data or may be stored as corrections to a larger data set. Moreover, changes to data objects may be of interest to multiple different systems in addition to those that perform ETL processing. For example, monitoring, security, or auditing systems may reason over data events to take different actions (e.g., defensive actions or data investigations). Therefore changes to data are of interest to many parties.

History information may be maintained that describes a data lineage or history of the changes to data over time. For example, history information may indicate when a data object is used as an input to an ETL process, or what ETL process the data object was generated from. As history information may provide a rich set of information about the changes to or links between data objects over time, data events may be defined against and detected by maintaining history information.

FIG. 1 is a logical block diagram illustrating maintaining history to detect data events, according to some embodiments. Data producer(s) 110 may be any entities that create or modify data objects stored in one or multiple data stores. Data objects, such as data files, directories, tables, byte ranges, data blocks, data pages, data chunks, or other data structures may be written, stored, updated, or deleted by data producer(s) 110. Data objects may contain unstructured data (e.g., documents, images, etc.), semi-structured data (e.g., comma separated value (CSV) files), or structured data (e.g., database tables). The creation of (or changes to) data objects may be performed as part of Extract, Transform, or Load (ETL) processes.

History 120 may be created, changed, modified, updated, or otherwise maintained by including or otherwise describing changes indicated by ETL process indications 112. For example, an ETL process indication 112 may include the input data (e.g., source data object(s)), input parameters (e.g., predicates, functions, or other ETL controls), and the resulting output data (e.g., transformed data object(s)). History 120 may be stored as a data structure, such as lineage data structures 620 discussed below with regard to FIG. 6, to describe the evolution of data objects from one state to another. For example, data object(s) 122a may be data objects stored in a raw format (e.g., direct from a data producer 110). Then ETL process 124a may be applied to generate data object(s) 122b, which may remove extraneous data, incomplete records, change the data schema and file format for the data objects. Another ETL process 124b may be applied to data objects 122b to generate transformed data object(s) 122c, which may be data objects with information combined or joined from other data objects (not illustrated, but may be indicated or described in history 120).

The changes described by updates to history 120 may evaluated with respect to event criteria, in various embodiments, for events that are associated with history 120. For example, a request, such as request 730 discussed below with regard to FIG. 7, to register an event for history 120 may describe conditions, such as a type of change to history 120 that triggers the event. The type of change, or other conditions or criteria may include, the storing of a new data object (e.g., as a result of an ETL process), aspects, features, attributes, or content of a data object transformed by an ETL process (e.g., size of a data object, number of records, number of records added/removed, file format, minimum or maximum data values, average of data values, etc.), the source of the data object (e.g., data producer, ETL process, etc.), the location of the data object or any other criteria related to the data object or ETL process that produced the data object.

If an event is identified, a notification of the event 132 may be provided to event subscriber(s) 130. Event subscriber(s) 130 may be an ETL service, system, or client (like ETL service 220 discussed below with regard to FIGS. 2-7), a monitoring service, security service, auditing service, or other system, service, device, or client that may perform task or operations dependent on data events for data objects described in history 120. For instance, a network-based retailer may update the listings of a website in response to a data event indicating changes to data objects representing inventory or offerings. A security or monitoring system may suspend access or halt processing of data objects in response to data events that are detected indicating deletions or updates to large numbers of records, in another example. Subscriber(s) 130 may submit event registrations to customize the events notified or may subscribe to standard or default events that are already monitored for.

Please note that the previous description of maintaining history to detect data events is a logical illustration and thus is not to be construed as limiting as to data producers, history content, representation, or structure, ETL process indications, data event notifications, or event subscribers.

This specification begins with a general description of a provider network that implements an extract, transform, load (ETL) service that maintains history information for data and identifies, transforms, and moves data stored in the provider network or in external data stores. Then various examples of the ETL service including different components/modules, or arrangements of components/module that may be employed as part of implementing the ETL service are discussed. A number of different methods and techniques to implement maintaining history to detect data events are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
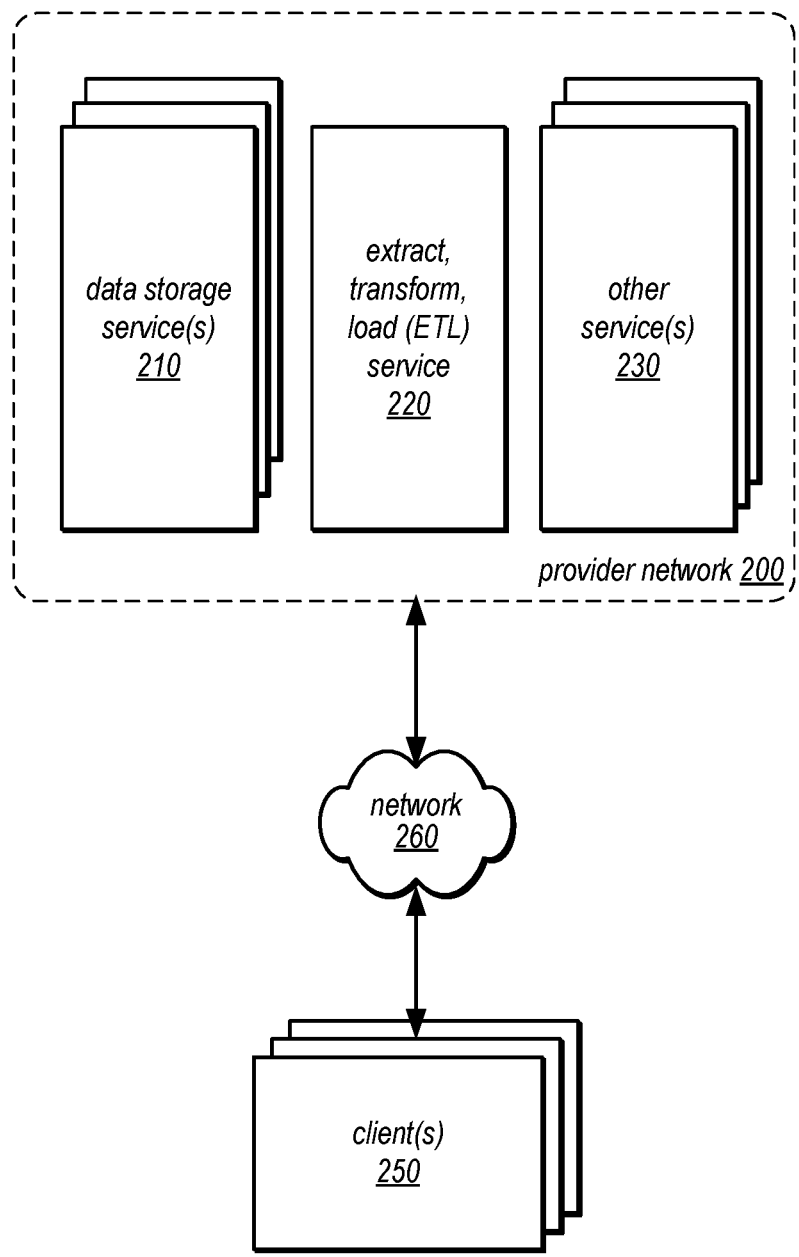
FIG. 2 is a logical block diagram illustrating a provider network offering different services including an extract, transform, load (ETL) service that performs ETL processing in response to data events, according to some embodiments.

FIG. 2 is a logical block diagram illustrating a provider network offering different services including an extract, transform, load (ETL) service that performs ETL processing in response to data events, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as a data storage service(s) 210 (e.g., object storage services, block-based storage services, or data warehouse storage services), ETL service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (i SC SI).

In some embodiments, ETL service 220 may create and dynamically update a catalog of data stored on behalf of clients in provider network 200 across the various data storage services 210. For example, a database stored in a non-relational database format may be identified along with container storing objects in an object-based data store as both being stored on behalf of a same customer of provider network 200. ETL service 220 may track updates or changes to the data described in the data catalog maintaining a history for the data objects, as discussed in detail below with regard to FIG. 5. ETL service 220 may also perform ETL jobs that extract, transform, and load from one or more of the various data storage service(s) 210 to another location. For example, the ETL service may provide clients with the resources to create, maintain, and orchestrate data loading jobs that take one or more data sets, perform various transformation operations, and store the transformed data for further processing (e.g., by one or more of data processing service(s)). In at least some embodiments, ETL jobs or processes may be performed in response to data events detected based on the history of the data objects maintained in the data catalog, as discussed below with regard to FIG. 4. The ETL service may access the data catalog generated by ETL service 220 in order to perform an ETL operation (e.g., a job to convert a data object from one file type into one or more other data objects of a different file type), in some embodiments.

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of ETL service 220 in order to invoke the execution of an ETL job to make data available for processing in a different location or data format for performing various processing operations with respect to data sets stored in data storage service(s) 210. In some embodiments, other service(s) 230 may be the clients of ETL service 220 in order to subscribe to or receive notifications of data events detected in the history of data objects maintained in the data catalog by ETL service 220.

Generally speaking, clients 250 may encompass any type of client configurable to submit network-based requests to provider network 200 via network 260, including requests for storage services (e.g., a request to create, read, write, obtain, or modify data in data storage service(s) 210, a request to generate an ETL job at ETL service 220, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
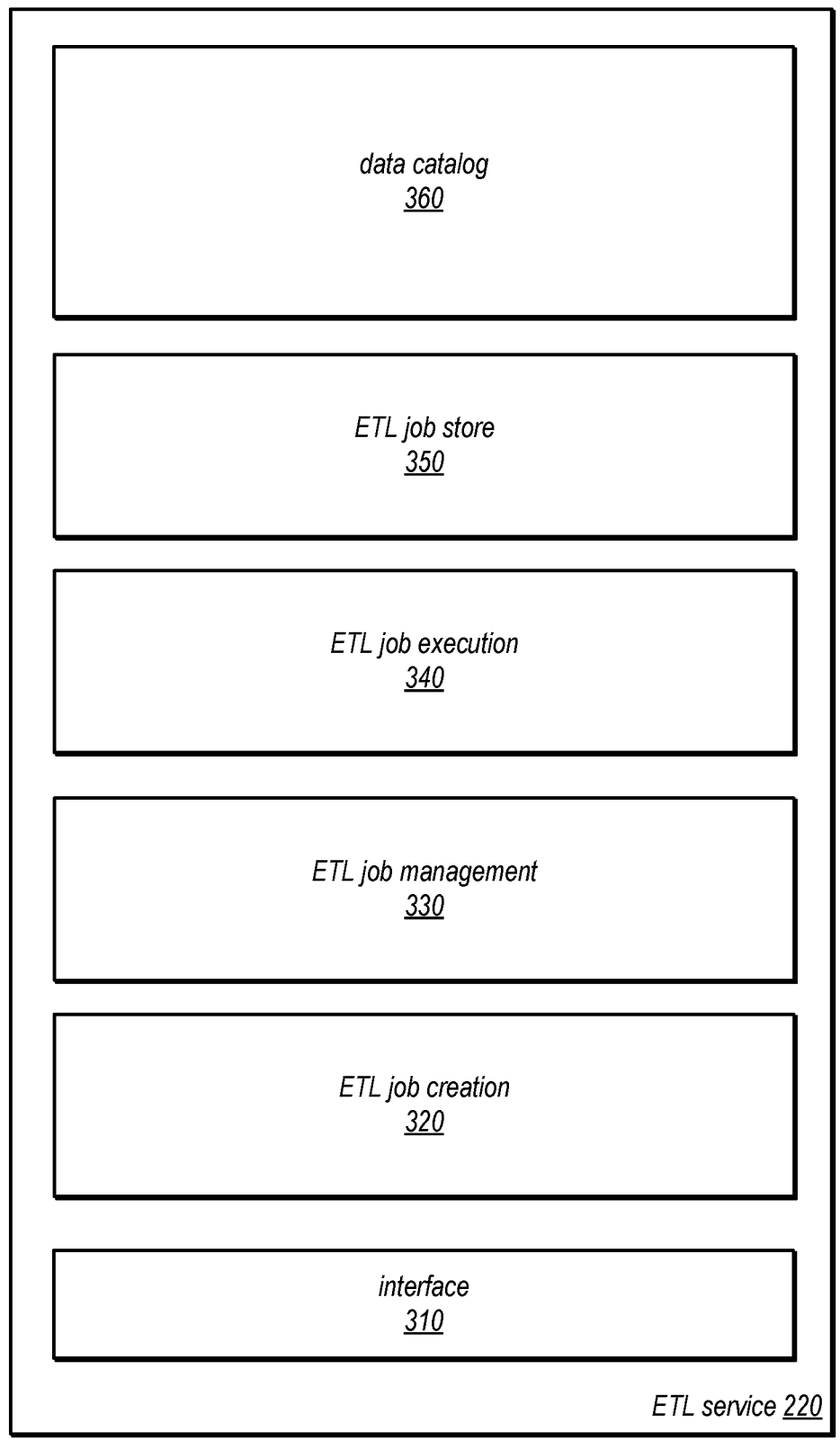
FIG. 3 is a logical block diagram illustrating an ETL service that performs ETL processing, according to some embodiments.

FIG. 3 is a block diagram illustrating an ETL service that performs event driven ETL processing, according to some embodiments. ETL service 220 may provide access to data catalog 360 and ETL jobs (for creation, management, and execution) via interface 310, which may be a programmatic interface (e.g., Application Programming Interface (API)), command line interface, and/or graphical user interface, in various embodiments.

ETL Service 220 may implement ETL job creation 320 to handle the creation of ETL jobs through manual job creation (e.g., creating, edit, or uploading ETL code or creating or editing graphs of ETL jobs) or through automated job creation. ETL job creation n20 may handle requests for automated ETL job creation and manual ETL job creation. For example, ETL job creation 320 may receive a job generation request, which may specify the data object and target data format for the ETL job. Other job information, such as access credentials, triggering events, or any other information to execute the ETL job may be included as part of the creation request or as part of a trigger event registration request. ETL job creation 320 may automatically generate ETL code to perform an ETL job by determining the source data format of the data object and the target data format of the data object. For example, in one embodiment, the source and target data formats may be determined from data catalog 360. In another embodiment, ETL job creation 320 may perform data format recognition techniques, or access other data stores (e.g., such as a data catalog stored in relational database) to retrieve the data format information. ETL job creation 320 may then compare the source data format and target data format or schema to select transformations to apply to the source data object to achieve the target data format. ETL job creation 320 may then generate code for the selected transformations and construct the source code for executing the selected transformations. The code for the ETL job may be stored in ETL job store 350 for subsequent execution.

ETL job creation 320 may also implement manual creation of ETL jobs. For example, transformation operations may be manually selected, combined, or assembled via graphical user interface to define a workflow of transformations to apply. Code corresponding to the workflow may be generated (or supplied by a user), edited, and stored for subsequent execution as part of ETL job store 350.

ETL service 220 may implement ETL job management 330 to provide clients with the ability to manage, edit, delete, or otherwise change ETL jobs. Trigger events, may also be defined for ETL jobs. For example, data events detected based on the history maintained for data objects may be registered as a trigger event for an ETL job. ETL job management 330 may subscribe to and receive data events and request execution of ETL jobs, as discussed below with regard to FIG. 4.

ETL service 220 may implement ETL job execution 340 to provide an execution platform ETL jobs. In some embodiments, ETL job execution 340 may provide a serverless architecture (from the perspective of clients) so that the appropriate number of resources are provisioned (e.g., virtual compute instances from a virtual compute service executing the ETL job code) in order to satisfy performance requirements, objectives, or goals provided by a client or by ETL service 220. ETL job execution 340 may execute jobs, in some embodiments, automatically without any user editing changes to the automatically generated ETL code from ETL job creation 320. In some embodiments, ETL job execution 340 may execute automatically generated ETL jobs that were modified. ETL job execution 340 may execute jobs in response to detected triggering events for ETL jobs (which may be detected by ETL job management or another system or service monitoring for triggering event conditions).

ETL service 220 may maintain data catalog 360 to describe data sets (stored in provider network 200 or in external storage locations) and maintain history for the data sets. ETL service 220 may identify unknown data objects, identify a data format for the unknown data objects and store the data format in a data catalog for the unknown data objects. ETL service 220 allow for catalog users, owners, or other stakeholders, to modify or otherwise manage data catalogs. For instance, ETL service 220 may process and execute access requests directed to data catalog 360 (e.g., requests to combine, delete, or split tables of metadata in the catalog or edit the metadata determined for a data catalog. ETL service 220 may implement access or control policies for data catalogs (e.g., to limit access to a data catalog to authorized users). ETL service 220 may implement data retention or life cycle policies to determine how long data catalogs (or older versions of data catalogs) are maintained. ETL service 220 may handle the provisioning of storage resources in data for creating new data catalogs. ETL service 220 may also perform load balancing, heat management, failure recovery, and other resource management techniques (e.g., implement durability requirements) to ensure the availability of data catalogs for clients.

Figure 4:
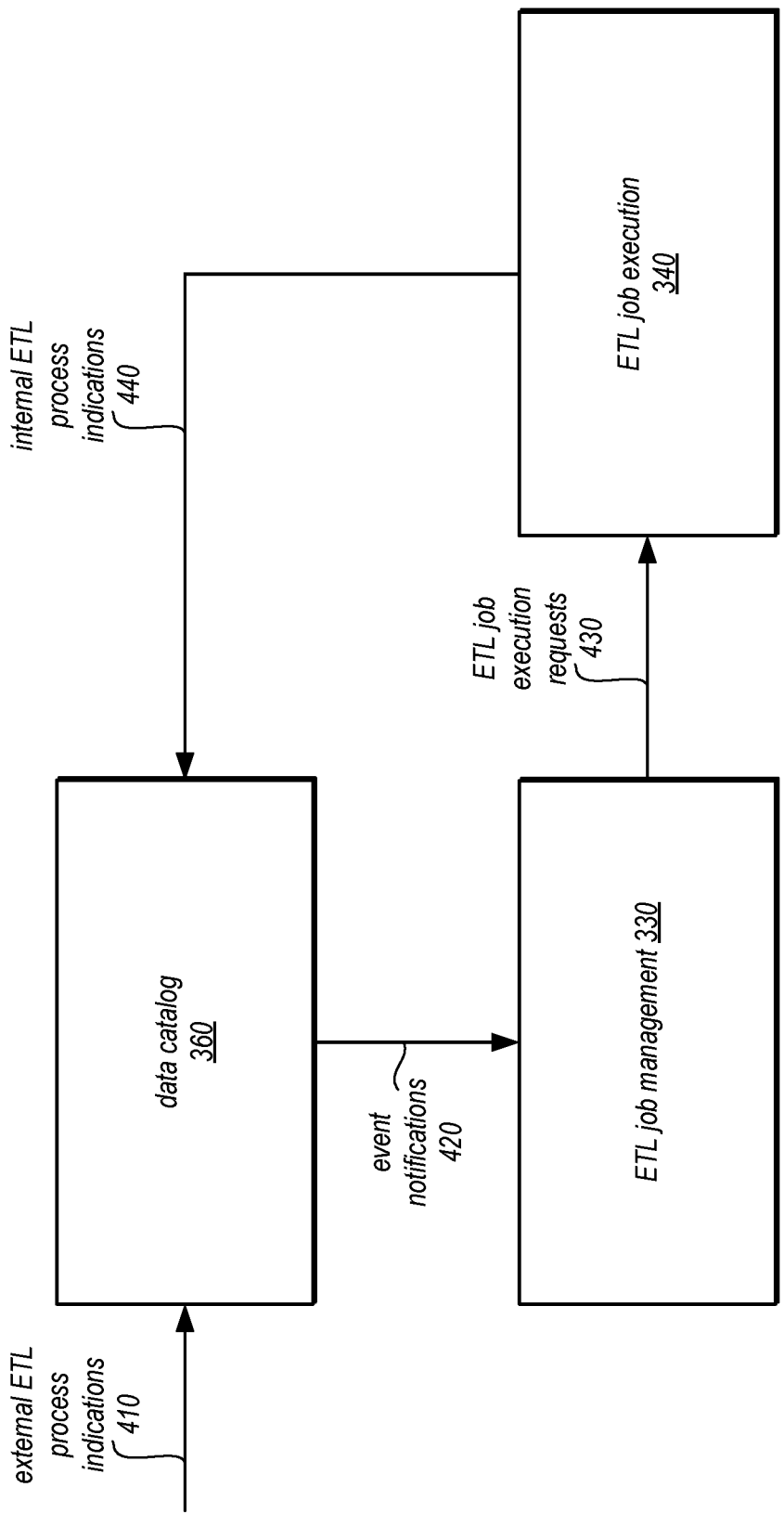
FIG. 4 is a logical block diagram illustrating a data catalog for the ETL service that maintains history, detects data events for the history, and provides notifications of data events to ETL job management, according to some embodiments.

Storage for data catalog 360 may be implemented by one or more storage nodes, services, or computing devices (e.g., system 1000 discussed below with regard to FIG. 9) to provide persistent storage for data catalogs generated by data catalog service 200. Such storage nodes (or other storage components of storage 360) may implement various query processing engines or other request handling components to provide access to data catalogs according to requests received via interface 310. For example, data catalog storage may be implemented as a non-relational database, in one embodiment, that stores file types and other metadata for data objects in table. In some embodiments, a collections of metadata for various data objects stored across different storage service(s) 210 on behalf a single user account may be stored together in a single catalog of metadata for user data objects that may be made accessible to clients FIG. 4 is a logical block diagram illustrating a data catalog for the ETL service that maintains history, detects data events for the history, and provides notifications of data events to ETL job management, according to some embodiments. ETL job management 330 may monitor for data events provided by notifications 420 from data catalog 360 that trigger ETL jobs and request the execution of ETL jobs 430 that satisfy execution criteria for the ETL job.

Data catalog 360 may maintain history information for data sets (as discussed below with regard to FIG. 5). Data catalog 360 may receive indications of ETL processes from external ETL clients 410 (e.g., ETL systems, components or devices implemented external to provider network 200 that submit ETL process indications 410 via network 260 to ETL service 220). Data catalog 360 may update the appropriate history for the ETL process indications 410. Likewise, data catalog 360 may receive internal ETL process indications 440 as the result ETL processes directed or performed by ETL job execution 340 and update the appropriate history for the ETL process indications 440. As discussed below with regard to FIG. 5, data catalog 360 may determine whether updates to the data catalog trigger data events registered on behalf of ETL job management 330. For example, a data event indicating the loading of a raw data object may be detected by an update to history information indicating an instance of a raw data object in the history has been added to the history structure. Once the event is detected, a notification of the event 420 is provided to ETL job management 330. In turn, ETL job management 330 may determine whether the event triggers the execution of an ETL job. If an ETL job is triggered (e.g., based on execution criteria or other information for the ETL job), then a request 430 may be provided to ETL job execution 340.

Figure 5:
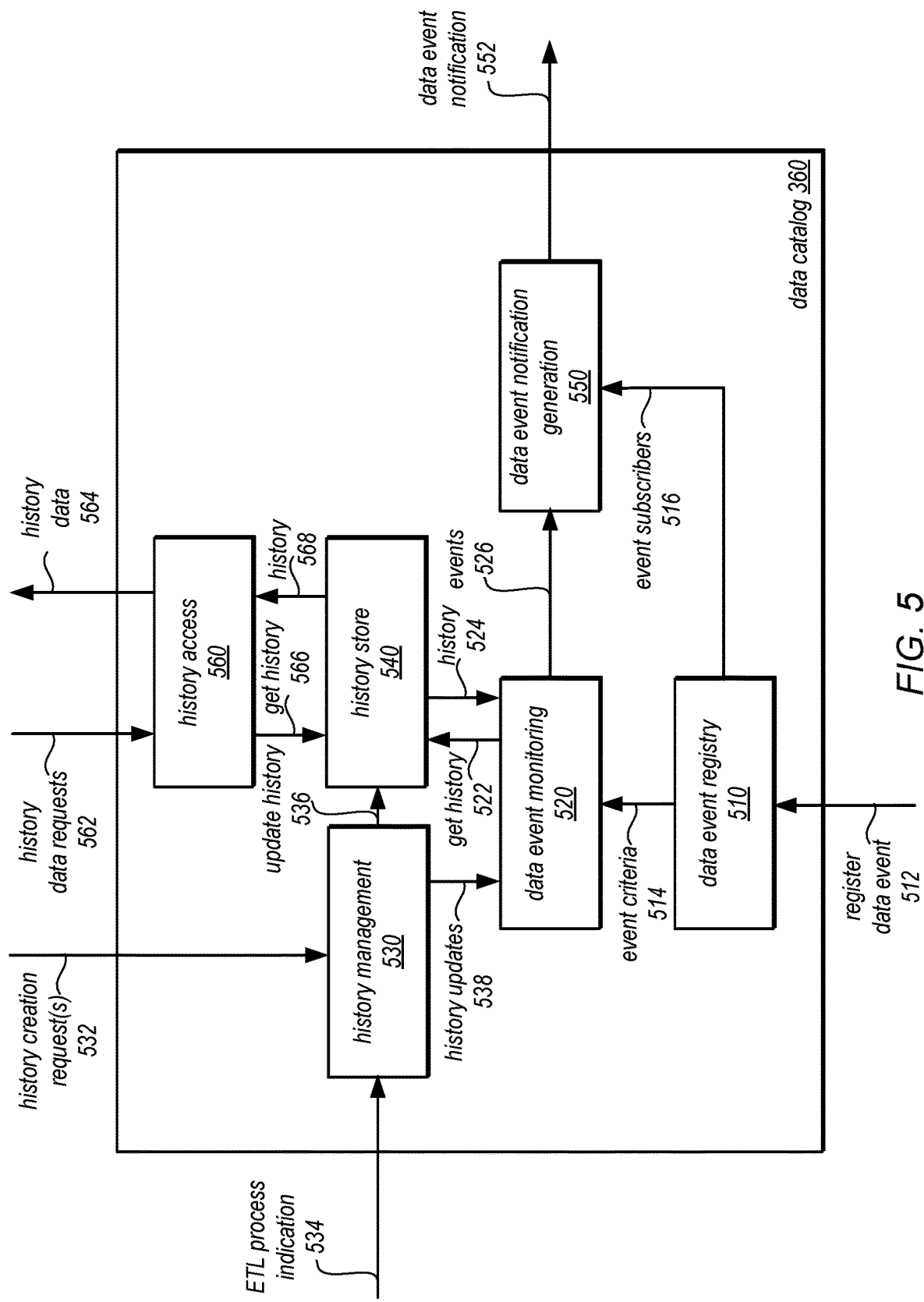
FIG. 5 is a logical block diagram illustrating a data catalog that maintains history, detects data events for the history, and sends notifications of the data events, according to some embodiments.

FIG. 5 is a logical block diagram illustrating a data catalog that maintains history, detects data events for the history, and sends notifications of the data events, according to some embodiments. In addition to storing data schema and other metadata for data objects, data catalog 360 may maintain history store 540, as illustrated in FIG. 5. History information may be stored in history store 540 in various formats or data structures. In some embodiments, history information may be stored according to graph (or set of objects from which a graph can be generated), as discussed below with regard to FIG. 6. History information can be updated 536, by history management 530 or accessed by history 560 in response to various different requests.

Data catalog 360 may implement history management 530 to handle the creation, modification, update, or other maintenance of history information stored in history store 540. For example, requests 532 to create history structure or objects may be handled by history management 530, which may interpret the changes to be made in the underlying history store 540 (e.g., which objects to add, remove, move, or modify, and what the content of the objects as results of the add, remove, move, or modify should be) and perform the appropriate updates 536 to the history. History management 530 may also handle indications of ETL processes 534 which may update the history 536 for the source data object to include the ETL process and transformed data objects generated as a result of the review call. For example, history management 530 may create a new instance of a history object in the history structure and store the requisite information (e.g., data schema version, ETL process, creator, storage location, input data, operational costs like time or resources consumed, etc.) in the history object.

For updates to history information, data catalog 360 may implement data event monitoring 520 to determine whether a data event has occurred. Data events may be registered 512 with data event registry 510 which may provide the event criteria 514 to data event monitoring 520. For example, event criteria that checks the size of new data objects generated by an ETL process may be provided to data event monitoring 520 indicated by history updates 538 provided by history management. History management 530 may then determine the new data object size from history management 530 or by requesting 522 and receiving history 524 (or other history information from) history store 540. For detected data events 526, data event notification generation 550 may generate a notification (according to a specified notification type) and send the notification 552 to subscribers (which may be provided 516 by data event registry 510). Data event notification generation 550, for example, may generate and send messages according to an API interface for data catalog 360 or ETL service 220 (e.g., interface 310).

Data catalog 360 may also provide access to history store 540. For example, data catalog 360 may implement history access 560 which may handle requests for history data 562. A request 562 for data that is particular a data object or the lineage of a string of data objects may be provided. History access 560 may interpret the request, and generate the appropriate access requests 566 to history store 540 in order to receive 568 and send history data 564. In at least some embodiments, history access 560 may generate and provide for display a history graph, such as discussed below with regard to FIG. 6. For example, the links between different data objects (e.g., objects that are the source and transformed version of other data objects) may be determined by evaluating the history and used to generate a visual representation of the graph illustrating the links that describe the data objects and transformations.

Figure 6:
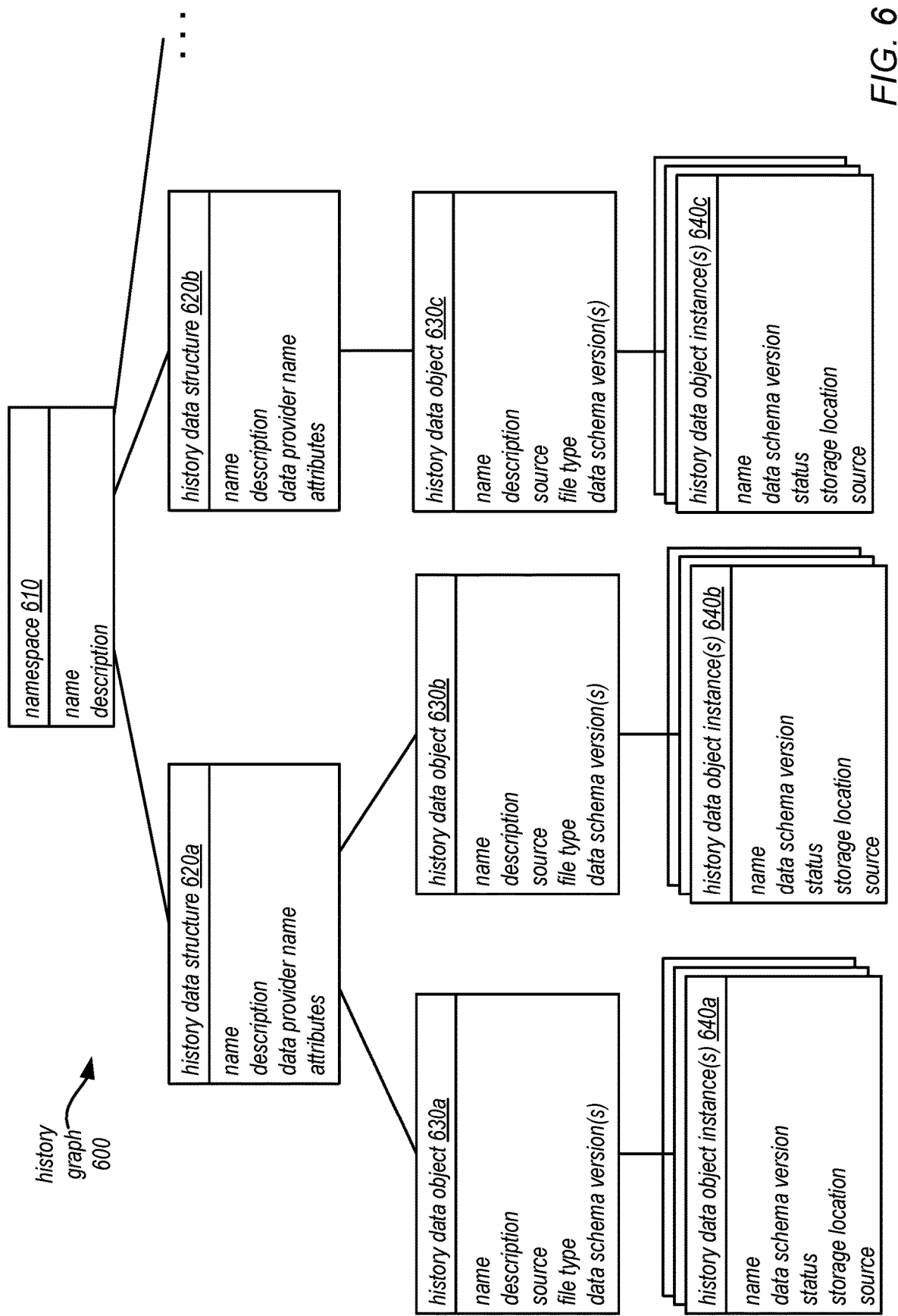
FIG. 6 illustrates an example history graph, according to some embodiments.

History information may be stored according to different data structures or formats. FIG. 6 illustrates an example history graph, according to some embodiments. For example, namespace 610 may be used as a container, directory, or other logical grouping of different history structures 620 in history graph 600 that are associated with a particular account, individual, team, project, etc. Namespace 610 may include name and/or description. For example, the namespace name may be used as an identifier that may be referenced in other history access requests, such as requests to create a new history data structure discussed below with regard to FIG. 7. The description may include any attributes, notes, or other information which may be provided to a user accessing history information (e.g., in response to a data history request 562) to determine the type or contents of history structures maintained within the namespace.

Linked to namespace 610, history data structures 620a and 620b may provide descriptions or collections of data objects represented or described by history information. For example, history data structure 620a may describe the history of a clickstream log that stores click action records for a network-based site. Different versions, transformations, or links between data objects that include the clickstream log (or are generated from the clickstream log may be included in one or more history data structures). History data structure 620 may include a name, description, data provider name (e.g., source of the data), and attributes of the data which may be defined when creating the history data structure. In some embodiments, the attributes of history data structures 620 may be inherited by the child history data objects linked to the history data structures 620 (e.g., a security designation or life cycle designation). Multiple history data objects may be linked to a single data structure, indicating different versions, or transformations of the Linked to history data structures, history data objects, such as history data objects 630*a* and 630*b* linked to history data structure 620*a*, and history data object 630*c* linked to history data structure 620*b*, may be provided to describe the type of data objects that may be generated, expected, and/or stored as part of the history structure. History data objects 630 may describe the name, description, source of the data object (which may be the ETL process or job and the input data or parameters to the ETL process or job, such as another history data object or structure), or file type, and may maintain data schema versions (e.g., storing the structure of the data, such as the number of columns, data types, default values, data fields, key values, etc.). Data schemas may change over time and thus multiple data schema versions may be maintained according to a version identifier.

History data object instance(s), such as object instances 640*a* linked to history data object 630*a*, object instances 640*b* linked to history data object 630*b*, and object instances 640*c* linked to history data object 630*c*. History data objects may describe specific, materialized versions of the data (e.g., specific data files, partitions, or other objects stored in a data store) and may include the name, data schema version, identity (by indicating a particular execution, run, or application of an ETL process or job to create the history data object by a process or job identifier and/or timestamp) and status of the ETL process that generated the object (e.g., complete or in process), storage location, or source data. For example, a history data object instance, may be a clickstream log for period of time (e.g., 1 day or 1 week) that is part of a history data structure maintained for click stream logs as discussed in the example above.

Figure 7:
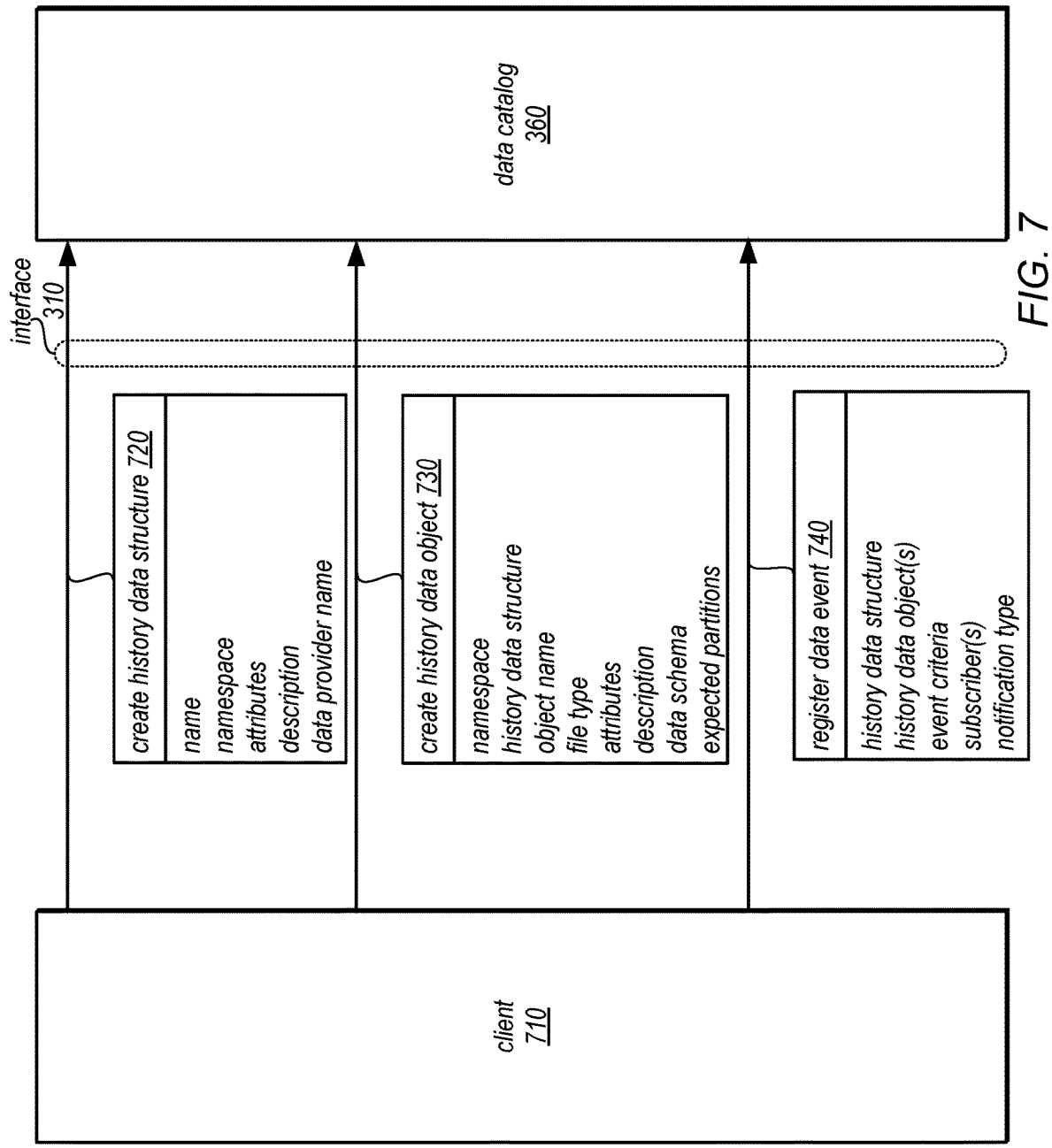
FIG. 7 illustrates interactions between a client and a data catalog service to manage or update a history structure, according to some embodiments.

FIG. 7 illustrates interactions between a client and a data catalog service to manage or update a history structure, according to some embodiments. As noted above, interface 310 may be a network-based, graphical, and/or programmatic interface (e.g., API), that allows clients, such as client 710 (which may be similar to clients 250 or discussed above with regard to FIG. 2 or component of ETL service 220 as discussed above in FIG. 4), access to data catalog 360. Client 710 may submit a request to create a history data structure 720. The request may include the name of the history data structure, the namespace to which it belongs, the attributes to be applied to all child objects, description, and/or data provider name. For example, the attributes may designate the data objects described by the history data structure as "confidential" data.

Client 710 may submit a request to create the history data object 730 to be included in a history data structure. For example, the request 730 may include the namespace of the history data structure (e.g., by identifier or name), the history data structure (e.g., by identifier or name), the object name, the file type (e.g., CSV, Optimized Row Columnar (ORC), text, JavaScript Object Notation (JSON), etc.), the attributes (e.g., in addition to those inherited from the history data structure), the description of the object, the data schema of the object, and may, in some embodiments, include an expected number of partitions of the object. For example, data objects may be partitioned by time period (e.g., by work day), so the expected number of partitions may be defined by a provided number or function.

Client 710 may submit a request to register a data event 740, in various embodiments. The request may include the history data structure (e.g., by identifier or name), history data object(s) (e.g., by identifier or name), event criteria (e.g., by including a list of condition statements, functions, operations, or other comparators), subscriber(s) of the event (e.g., by including identifiers like user identifiers, electronic mail addresses, network addresses, etc.), and a notification type for the subscribers (e.g., electronic message, phone call, etc.). In some embodiments, the event registration can be subsequently modified or deleted (not illustrated).

Figure 8:
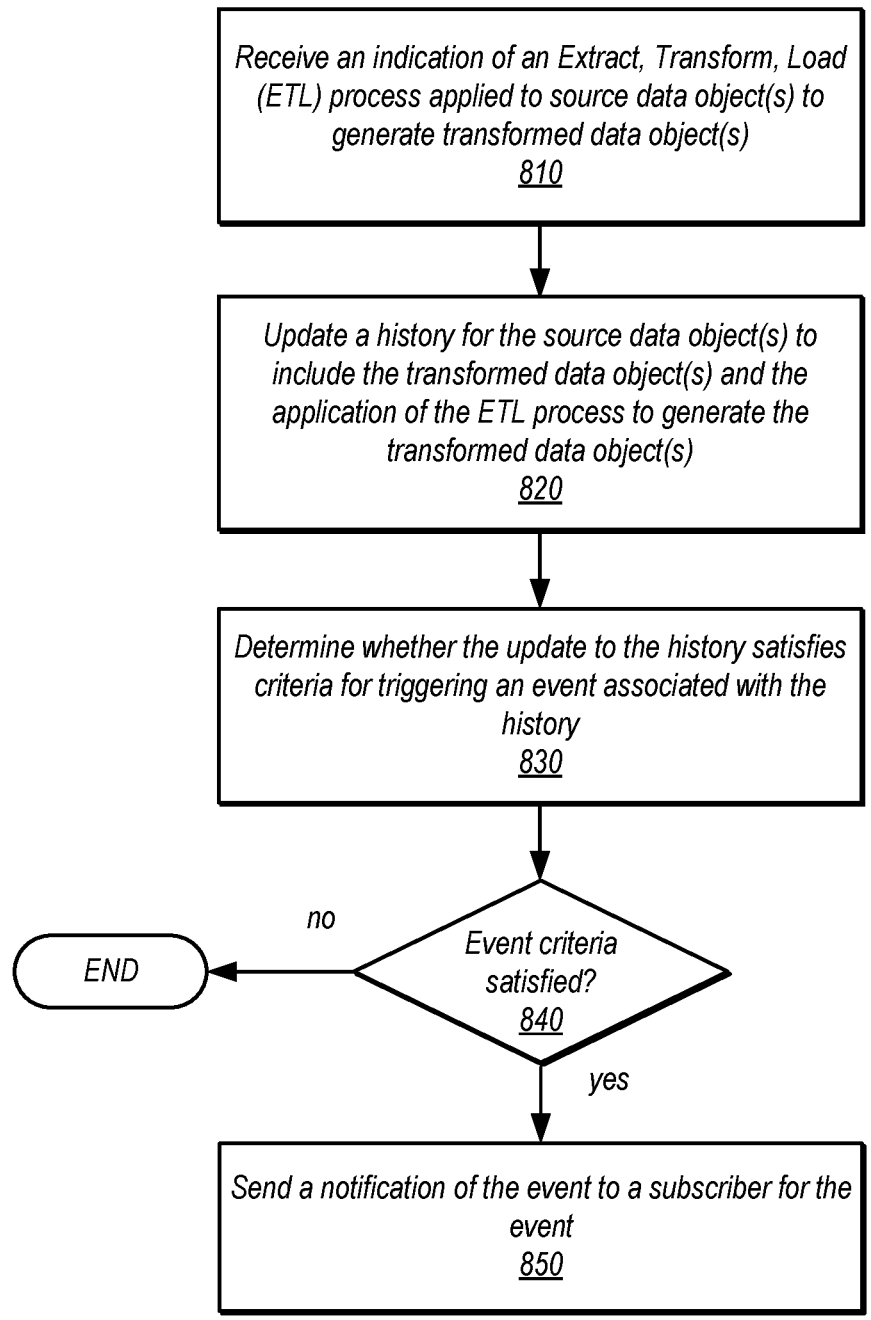
FIG. 8 is a high-level flowchart illustrating methods and techniques to implement maintaining history to detect data events, according to some embodiments.

Although FIGS. 2-7 have been described and illustrated in the context of an ETL service, the various techniques and components illustrated and described in FIGS. 2-7 may be easily applied to other data access or management systems in different embodiments that may facilitate operations dependent on data events. Stand-alone ETL processing systems are an example of another embodiment that may be implemented in private networks or systems to perform similar techniques to those described above. As such, FIGS. 2-7 are not intended to be limiting as to other embodiments of a system that may implement event driven ETL processing. FIG. 8 is a high-level flowchart illustrating methods and techniques to implement maintaining history to detect data events, according to some embodiments. Various different systems and devices may implement the various methods and techniques described below, either singly or working together. For example, an ETL service such as described above with regard to FIGS. 2-7 may be configured to implement the various methods. Alternatively, a combination of different systems and devices, such as a data monitoring or security system that manages access to data may perform operations dependent upon notifications determined from the below techniques. Therefore, the above examples and or any other systems or devices referenced as performing the illustrated method, are not intended to be limiting as to other different components, modules, systems, or configurations of systems and devices.

As indicated at 810, an indication of an ETL process applied to source data object(s) to generate a transformed data object(s) may be received. For example, the indication may be submitted via an API request and include information that identifies the source objects (e.g., by object identifiers), the ETL process (e.g., describing the ETL process by identifier or by describing the content of the ETL process, such as a process that filters, aggregates, removes, or otherwise reformats the source data objects), input controls or parameters for the ETL process, costs to perform the ETL process (e.g., I/O bandwidth, network bandwidth, processor usage, time, size of transformed data object(s), resource costs in terms of work units or monetary value).

The history for the source data object(s) may be updated to include the transformed data object(s) and the application of the ETL process to generate the transformed data object(s), as indicated at 820, in various embodiments. For example, a data structure maintaining the history information, such as a graph structure described above with regard to FIG. 6, may be updated to include new data objects that describe the ETL process, transformed data objects, and any other information maintained as part of the history. In at least some embodiments, ETL process performance metrics, costs, or other process information may be maintained. The identity of a user, client, account, or entity that invoked the ETL processed may be included as part of the history information.

As indicated at 830, the update to the history may be evaluated to determine whether the update satisfies criteria for triggering an event associated with the history, in some embodiments. For example, criteria may include the storing of a new data object (e.g., as a result of an ETL process), aspects, features, attributes, or content of a data object transformed by an ETL process (e.g., size of a data object, number of records, number of records added/removed, file format, values or information determined from the values of the data object like averages, aggregations, or other statistics, etc.), the source of the data object (e.g., data producer, ETL process, etc.), the location of the data object or any other criteria related to the data object or ETL process that produced the data object. One or multiple criteria may be evaluated. In some embodiments, alternative sets of criteria for an event may be evaluated so that if one set of criteria is satisfied then the event is triggered. In this way, the execution of actions taken in response to data evens may be tailored to specific events, conditions, or scenarios with respect to the data objects described in the history.

As indicated by the negative exit from 840, if the event criteria is/are not satisfied, then no further action may be taken in response to the indication of the ETL process. If, however the event criteria is/are satisfied, then as indicated at 850, a notification of the event may be sent to a subscriber for the event, in some embodiments. For example, an API call, electronic mail message, notification posting, SMS or MMS message, telephone call or any other type of notification may be performed. In some embodiments, different subscribers may receive the notification event according to different notification techniques. The denies of the subscribers may be determined based on a list or registry of subscribers. In some embodiments, data notifications may be broadcast to a default set or list of subscribers, irrespective of the type of data event that is triggered. For example, all data events for a particular history may be sent to the same subscribers (even if not all of those subscribers may act in response to the same events). However, in other example, notifications of different data events for the same history may be provided to different subscribers.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
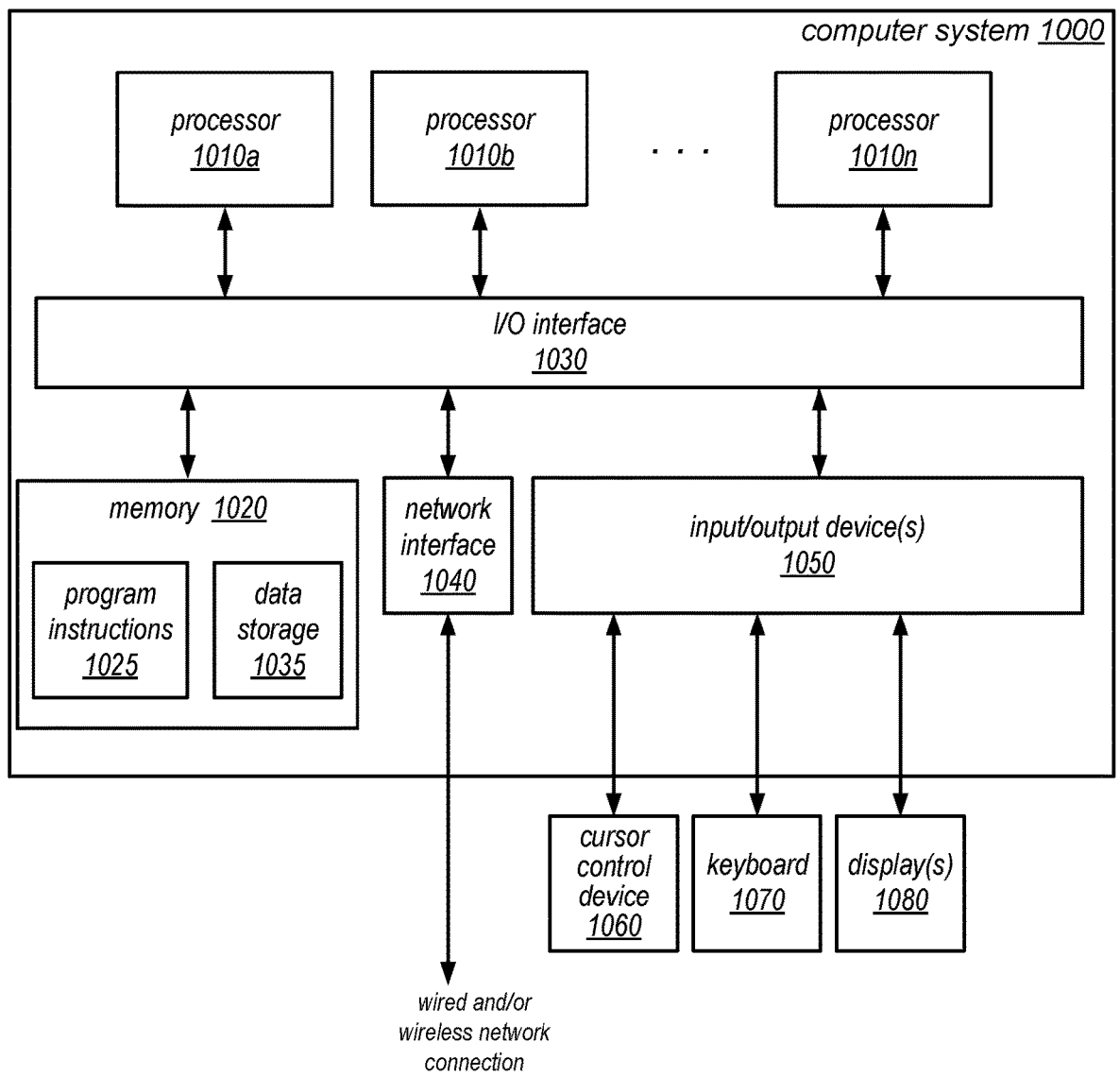
FIG. 9 illustrates an example system configured to implement the various methods, techniques, and systems described herein, according to some embodiments.

Embodiments of maintaining history to detect data events as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, multiple nodes of an ETL service may present ETL services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a data catalog for an Extract, Transform, Load (ETL) service, the data catalog configured to:
      receive, at the data catalog, an indication of a first ETL process applied to one or more source data objects to generate one or more transformed data objects;
      store, in the data catalog, an instance of a history object in a history data structure according to the received indication, the history object created in the history data structure to specify information expected to be stored to describe the performance of the first ETL process on a given source data object to generate a transformed data object;
      evaluate, in the data catalog, the stored information that describes the performance of the first ETL process in the instance of the history object with respect to criteria for triggering an event to perform a second ETL process subscribed to the event to determine that the performance of the first ETL process satisfies the criteria for triggering the event, the event registered for monitoring with regard to the history object; and
      in response to the determination that the performance of the first ETL process satisfies the criteria for triggering the event, cause the second ETL process to be performed.

2. The system of claim 1, wherein a second history object is created in the history data structure, and wherein the data catalog is further configured to:
   receive, at the data catalog, an indication of a third ETL process applied to one or more different source data objects to generate one or more different transformed data objects;
   store, in the data catalog, an instance of the second history object in the history data structure according to the received indication of the third ETL process, the second history object created in the history data structure to specify information expected to be stored to describe the performance of the third ETL process;
   evaluate, in the data catalog, the stored information that describes the performance of the third ETL process in the instance of the second history object with respect to criteria for triggering a different event to perform a fourth ETL process subscribed to the different event to determine that the performance of the third ETL process satisfies the criteria for triggering the event, the event registered for monitoring with regard to the second history object; and
   in response to the determination that the performance of the third ETL process satisfies the criteria for triggering the different event, cause the fourth ETL process to be performed.

3. The system of claim 1, wherein the data catalog service is further configured to:
   further in response to the determination that the performance of the first ETL process satisfies the criteria for triggering the event, send a notification of the event to another subscriber different than the second ETL process.

4. The system of claim 1, wherein the second ETL process is applied to the one or more transformed data objects.

5. The system of claim 1, wherein the first ETL process is performed external to the ETL service and wherein the second ETL process is performed by the ETL service.

6. The system of claim 1, wherein the first ETL process is performed by the ETL service and wherein the second ETL process is performed by the ETL service.

7. The system of claim 1, wherein the criteria is one of a plurality of different alternative criteria registered for triggering the event.

8. A method, comprising:
   receiving, at a data catalog for an Extract, Transform, Load (ETL) service, an indication of a first ETL process applied to one or more source data objects to generate one or more transformed data objects;
   storing, in the data catalog, an instance of a history object in a history data structure according to the received indication, the history object created in the history data structure to specify information expected to be stored to describe the performance of the first ETL process on a given source data object to generate a transformed data object;
   evaluating, in the data catalog, the stored information that describes the performance of the first ETL process in the instance of the history object with respect to criteria for triggering an event to perform a second ETL process subscribed to the event to determine that the performance of the first ETL process satisfies the criteria for triggering the event, the event registered for monitoring with regard to the history object; and
   in response to determining that the performance of the first ETL process satisfies the criteria for triggering the event, causing the second ETL process to be performed.

9. The method of claim 8, wherein a second history object is created in the history data structure, and wherein the method further comprises:
   receiving, at the data catalog, an indication of a third ETL process applied to one or more different source data objects to generate one or more different transformed data objects;
   storing, in the data catalog, an instance of the second history object in the history data structure according to the received indication of the third ETL process, the second history object created in the history data structure to specify information expected to be stored to describe the performance of the third ETL process;

evaluating, in the data catalog, the stored information that describes the performance of the third ETL process in the instance of the second history object with respect to criteria for triggering a different event to perform a fourth ETL process subscribed to the different event to determine that the performance of the third ETL process satisfies the criteria for triggering the event, the event registered for monitoring with regard to the second history object; and in response to determining that the performance of the third ETL process satisfies the criteria for triggering the different event, causing the fourth ETL process to be performed.

10. The method of claim 8, further comprising:

further in response to determining that the performance of the first ETL process satisfies the criteria for triggering the event, sending a notification of the event to another subscriber different than the second ETL process.

11. The method of claim 8, wherein the second ETL process is applied to the one or more transformed data objects.

12. The method of claim 8, wherein the first ETL process is performed external to the ETL service and wherein the second ETL process is performed by the ETL service.

13. The method of claim 8, wherein the first ETL process is performed by the ETL service and wherein the second ETL process is performed by the ETL service.

14. The method of claim 8, wherein the criteria is one of a plurality of different alternative criteria registered for triggering the event.

15. One or more non-transitory, computer-readable storage media, storing program instructions that when executed on or across one or more computing devices, cause the one or more computing devices to implement:

receiving, at a data catalog for an Extract, Transform, Load (ETL) service, an indication of a first ETL process applied to one or more source data objects to generate one or more transformed data objects;

storing, in the data catalog, an instance of a history object in a history data structure according to the received indication, the history object created in the history data structure to specify information expected to be stored to describe the performance of the first ETL process on a given source data object to generate a transformed data object;

evaluating, in the data catalog, the stored information that describes the performance of the first ETL process in the instance of the history object with respect to criteria for triggering an event to perform a second ETL process subscribed to the event to determine that the performance of the first ETL process satisfies the criteria for triggering the event, the event registered for monitoring with regard to the history object; and in response to determining that the performance of the first ETL process satisfies the criteria for triggering the event, causing the second ETL process to be performed.

16. The one or more non-transitory, computer-readable storage media of claim 15, wherein a second history object is created in the history data structure, and wherein the one or more non-transitory, computer-readable storage media store further instructions that when executed on or across the one or more computing devices cause the one or more computing devices to further implement:

receiving, at the data catalog, an indication of a third ETL process applied to one or more different source data objects to generate one or more different transformed data objects;

storing, in the data catalog, an instance of the second history object in the history data structure according to the received indication of the third ETL process, the second history object created in the history data structure to specify information expected to be stored to describe the performance of the third ETL process;

evaluating, in the data catalog, the stored information that describes the performance of the third ETL process in the instance of the second history object with respect to criteria for triggering a different event to perform a fourth ETL process subscribed to the different event to determine that the performance of the third ETL process satisfies the criteria for triggering the event, the event registered for monitoring with regard to the second history object; and in response to determining that the performance of the third ETL process satisfies the criteria for triggering the different event, causing the fourth ETL process to be performed.

17. The one or more non-transitory, computer-readable storage media of claim 15, storing further instructions that when executed on or across the one or more computing devices cause the one or more computing devices to further implement:

further in response to determining that the performance of the first ETL process satisfies the criteria for triggering the event, sending a notification of the event to another subscriber different than the second ETL process.

18. The one or more non-transitory, computer-readable storage media of claim 15, wherein the second ETL process is applied to the one or more transformed data objects.

19. The one or more non-transitory, computer-readable storage media of claim 15, wherein the first ETL process is performed external to the ETL service and wherein the second ETL process is performed by the ETL service.

20. The one or more non-transitory, computer-readable storage media of claim 15, wherein the first ETL process is performed by the ETL service and wherein the second ETL process is performed by the ETL service.

* * * * *